(12) United States Patent
Deters et al.

(10) Patent No.: US 9,931,690 B2
(45) Date of Patent: Apr. 3, 2018

(54) MOLDING MATERIAL MIXTURES CONTAINING BARIUM SULFATE

(71) Applicant: ASK Chemicals GmbH, Hilden (DE)

(72) Inventors: Heinz Deters, Düsseldorf (DE); Jörg Körschgen, Leichlingen (DE); Martin Oberleiter, Düsseldorf (DE)

(73) Assignee: ASK CHEMICALS GMBH, Hilden (DE)

( * ) Notice: Subject to any disclaimer, the term of this patent is extended or adjusted under 35 U.S.C. 154(b) by 346 days.

(21) Appl. No.: 14/405,698

(22) PCT Filed: Jun. 6, 2013

(86) PCT No.: PCT/DE2013/000309
§ 371 (c)(1),
(2) Date: Dec. 4, 2014

(87) PCT Pub. No.: WO2013/182186
PCT Pub. Date: Dec. 12, 2013

(65) Prior Publication Data
US 2015/0174644 A1    Jun. 25, 2015

(30) Foreign Application Priority Data

Jun. 6, 2012  (DE) .................. 10 2012 104 934

(51) Int. Cl.
| | |
|---|---|
| B22C 1/18 | (2006.01) |
| B22C 9/02 | (2006.01) |
| B22C 9/12 | (2006.01) |
| C04B 35/14 | (2006.01) |

(52) U.S. Cl.
CPC .............. *B22C 1/181* (2013.01); *B22C 1/188* (2013.01); *B22C 9/02* (2013.01); *B22C 9/12* (2013.01); *C04B 35/14* (2013.01); *C04B 2235/3418* (2013.01); *C04B 2235/3427* (2013.01); *C04B 2235/48* (2013.01)

(58) Field of Classification Search
CPC ........... B22C 1/188; B22C 1/181; B22C 9/02; B22C 9/12
See application file for complete search history.

(56) References Cited

U.S. PATENT DOCUMENTS

| | | |
|---|---|---|
| 4,008,109 A | 2/1977 | Norton |
| 6,008,152 A | 12/1999 | Guillo |
| 7,608,302 B2 | 10/2009 | Bischoff et al. |
| 7,770,629 B2 | 8/2010 | Weicker |
| 8,460,453 B2 | 6/2013 | Bohlander |
| 2008/0029240 A1 | 2/2008 | Gerlach |
| 2010/0173767 A1 | 7/2010 | Koch |
| 2010/0224756 A1 | 9/2010 | Muller |
| 2010/0326620 A1* | 12/2010 | Muller .................... B22C 1/188 164/528 |

FOREIGN PATENT DOCUMENTS

| | | |
|---|---|---|
| DE | 102007045649 | 4/2009 |
| GB | 1261206 | 1/1972 |
| GB | 1532847 | 11/1978 |
| JP | 54-96425 A | 7/1979 |
| JP | 63-52745 A | 3/1988 |
| JP | 2001-129640 A | 5/2001 |
| SU | 1159715 A | 6/1985 |

OTHER PUBLICATIONS

Rudolph, Stefan; Klein, Friedrich: "Einsatz von Bornitrid-Schlichten im praktischen Betrieb der Druck-und Kokillengießereien", Giesserei 80 No. 8,1993, pp. 256-259
Afshar, Saied; Gaubert, Christophe and Allaire, Claude: „ The Effects of Fumed Silica and Barite on the Aluminum Resistance of Alumi-na Castables, Journal of the Minerals, Metals and Material Society (JOM), vol. 55, No. 11, 2003, pp. 66-69.
Trippelsdorf, Frank: Feuerfeste Zustellung für Aluminium, Giesserei-Erfahrungsaustausch 9 + 10, 2011, pp. 33-35.
Schneider, Harald; Döpp, Reinhard:<< Einige chemische und strukturelle Untersuchungen zum Wasserglas-CO2-Verfahren-Teil 1, Schrifttumsübersicht und Ergebnisse chemischer Untersuchungen >>, Giessereiforschung, Giesserei Verlag, Düsseldorf, vol. 43, No. 1, Jan. 1, 1991, pp. 1-9, XP009170740, ISSN ; 0046-5933.
Schneider, Harald; Döpp, Reinhard: << Einige chemische und strukturelle Untersuchungen zum Wasserglas-CO2-Verfahren-Teil 2, Schrifttums-übersicht und Ergebnisse chemischer Untersuchungen >>, Giessereiforschung, Giesserei Verlag, Düsseldorf, vol. 43, No. 2, Jan. 1, 1991, pp. 63-73, XP009170740, ISSN ; 0046-5933.
Zhu, Chun-Xi, << Recent advances in waterglass sand technologies >>, China Foundry, Bs. 4, No. 1, 2007, XP002699800.
Trbizan, M. ; Lenasi, S. ; Debenjak, D., Pikalo, A. : << Preparation of coresby the carbon dioxide process and their disintegration after cas-ting >>, Livarski Vestnik (1975)22 (1-2), 13-46 ISSN : 0024-5135 as Abstract (searched Nov. 1, 2013), Chemical Abstract Service (CAPLUS) online STN Accession No. 1976 :47872.

* cited by examiner

Primary Examiner — Kevin P Kerns
Assistant Examiner — Steven S Ha
(74) *Attorney, Agent, or Firm* — Standley Law Group LLP

(57) ABSTRACT

The invention relates to molding material mixtures containing barium sulfate in combination with refractory basic molding materials and a waterglass-based binder system for producing casting molds and cores for the foundry industry in order to obtain cast pieces, in particular aluminum ones, which have an improved cast surface.

17 Claims, No Drawings

MOLDING MATERIAL MIXTURES CONTAINING BARIUM SULFATE

The invention relates to molding material mixtures containing barium sulfate in combination with refractory basic molding materials, and a waterglass-based binding system for producing casting molds and cores for the foundry industry in order to obtain cast pieces, in particular aluminum ones, which have an improved cast surface. The improvement manifests itself in particular in a reduction of sand adhesion, burning-in of sand and penetration/roughness.

PRIOR ART

Casting molds consist essentially of cores and molds, which represent the negative shapes of the cast piece to be produced. These cores and molds here consist of a refractory material, for example a quartz sand, and of a suitable binder which imparts sufficient mechanical strength to the cast piece after the removal from the molding tool. For the manufacture of casting molds, one therefore uses a refractory basic molding material which is coated with an appropriate binder. The refractory basic molding material is preferably in a pourable form, so that it can be filled into a suitable hollow mold and compacted therein. By means of the binder, a solid cohesion is produced between the particles of the basic molding material, so that the casting mold receives the required mechanical stability.

Casting molds have to satisfy various requirements. During the casting process itself, they first must have sufficient strength and temperature resistance, in order to be able to receive the liquid metal in the hollow cavity formed from one or more (partial) casting molds. After the beginning of the solidification process, the mechanical stability of the cast piece is ensured by a solidified metal layer that forms along the walls of the casting mold. The material of the casting mold now has to decompose under the influence of the heat released by the metal, in such a manner that it loses its mechanical strength, that is to say the cohesion between the individual particles of the refractory materials is eliminated. In the ideal case, the casting mold disintegrates again to form a fine sand which can be removed effortlessly from the cast piece.

Recently, it has increasingly been required, in addition, that during the production of the casting molds as well as during the implementation of the casting and cooling, to the extent possible, no emissions in the form of $CO_2$ or hydrocarbons are produced, in order to protect the environment and to limit the odor nuisance in the environment caused by (primarily aromatic) hydrocarbons. In order to satisfy these new requirements, inorganic binding systems have been developed or refined in recent years, the use of which leads to preventing or at least clearly minimizing the emissions of $CO_2$ and hydrocarbons in the manufacture of metal molds. However, the use of inorganic binding systems is frequently associated with other disadvantages, which are described in detail in the following explanations.

Compared to organic binders, inorganic binders have the disadvantage that the casting molds produced therefrom have relatively low strengths. This becomes apparent particularly clearly immediately after the removal of the casting mold from the tool. However, good strengths are particularly important at this time for the production of complicated and/or thin-walled mold portions and their reliable handling. The resistance to air humidity is also considerably reduced in comparison to organic binders. EP 1 802 409 B1 discloses that higher immediate strengths and higher resistance to air humidity can be achieved by using a refractory basic molding material, a waterglass-based binder as well as additives consisting of synthetic amorphous silicon dioxide. By means of this additive, a reliable handling of even complicated casting molds can be ensured.

The inorganic binding system described in EP 1802409 B1 can lead to strong sand adhesions to the cast piece, in comparison to organic binders, which is associated with a considerable cleaning effort and thus added costs for the foundries. WO 2008/046651 discloses in this context that such sand adhesion to the cast piece can be clearly minimized if a hydrocarbon is added to the molding material mixture consisting of a refractory basic molding material, a waterglass-based binder as well as an addition of a particulate metal oxide which is selected from the group of silicon dioxide, aluminum oxide, titanium oxide and zinc oxide.

The surface quality of the cast piece can thus be improved by the addition of a carbohydrate. However, the addition of carbohydrates to the molding material mixture leads during the metal casting again to emissions of $CO_2$ and hydrocarbons—although in a clearly reduced form in comparison to purely organic binder systems.

It is generally known in the foundry industry that the use of certain refractory materials as a coating of cast pieces can considerably increase the surface quality of the cast piece in question. These refractory materials can be applied, for example, in the form of aqueous or alcohol-based suspensions, so-called black washes, onto the casting mold using various methods. Subsequently, a drying process takes place in order to remove the liquid medium. Alternatively, these refractory materials can also be applied in dry form. The refractory materials used are characterized by a low interaction as well as by a satisfactory non-wetting with a metal melt. Furthermore, these materials are in a very fine particulate form, in order to minimize the ridge-and-valley structure of the surface of the basic molding material (for example, quartz sand), and thus to prevent the metal melt from penetrating into these valleys promoted by good wetting properties of the basic molding material (for example, $SiO_2$), which in turn would lead to a poor surface quality of the cast piece in question.

Frequently, materials are used that have a layer structure, such as, for example, talc, hexagonal boron nitride (see also "Einsatz von Bornitrid-Schlichten im praktischen Betrieb der Druck- and KokillengieBerei," Giesserei 80, No. 8, 1993, pp. 256-259) or graphite. It is assumed that the layers become aligned parallel to the surface of the casting mold and thus a smooth surface can be produced. Other fine particulate, inorganic materials can also be used as coating material, provided that they do not interact or react with the melt and/or preferably have a satisfactory non-wetting behavior with the metal melt (in particular aluminum melt). Such materials are, for example, corundum ($Al_2O_3$) or zirconium silicate ($ZrSiO_4$). However, the use of coatings is also associated with considerable disadvantages. The amount of work and material is clearly greater for the foundries, which naturally leads to higher costs.

It should also be noted that the use of aqueous black washes can affect the stability of casting molds bound with inorganic binding systems. For these reasons, one generally seeks to minimize the use of so-called black washes.

The low wetting effect of $BaSO_4$ relative to nonferrous metal melts (NF metal melts), in particular melts of aluminum and/or aluminum alloys, is in principle known in the literature (see U.S. Pat. No. 6,008,152, "The effects of fumed silica and barite on the aluminum resistance of alumina castables" (Journal of the Minerals, Metals and Materials Society (JOM), Volume 55, Number 11, Year 2003, pp. 66-69) and "Feuerfeste Zustellung für Aluminium" (Giesserei-Erfahrungsaustausch 9+10, Year 2011, pp. 33-35)). Another low-wetting additive is $CaF_2$. However, the low-wetting additives in these cases are used as additive for producing gutters and tubes as well as linings of aluminum melting furnaces, in order to increase the resistance to corrosion of the corresponding refractory material. By the addition of barium sulfate as low-wetting additive to the refractory material, which can contain silica and/or silica powder, the chemical resistance of the fire-resistance material to aluminum melts is thus improved, thus allowing the longest lasting possible usability of the molds manufactured therefrom. The above references all have in common that no waterglass is used.

Gutters and tubes or linings of aluminum melting furnaces are characterized by a long-lasting usability, while the cores or casting molds, after having been used once, should disintegrate without leaving any residue to the extent possible. Moreover, the casting molds that are usually used have a much higher porosity than the sintered refractory materials, which are used as gutters tubes for the transport of aluminum melts in aluminum melting furnaces. This results, for casting molds, in a very different requirement profile from that for linings of aluminum melting furnaces.

The problems of the prior art and description of the problem

The inorganic binder systems for foundry purposes known to date still leave much room for improvement. Above all, it is desirable to develop a completely inorganic binder system which (a) does not allow the formation of emissions of $CO_2$ and organic pyrolysis products during the metal casting, (b) achieves a corresponding strength level that is required in the automatic finishing process (in particular heat resistances and strengths after storage), and (c) allows the obtention of a cast surface of the cast piece which presents clearly less sand adhesion, burning-in of sand, penetration and discoloration, and thus minimizes the cleaning effort for the cast pieces, without coatings or black washes. The further processing of cast pieces requires a high expenditure of time, labor and material, and it therefore represents a considerable cost factor in the production. Already immediately after the removal from the casting mold, the cast piece should therefore already have a high surface quality.

The invention is therefore based on the problem of making available a molding material mixture for producing casting molds for metal processing, which comprises at least one refractory basic molding material as well as a waterglass-based binder system, which allows the production of casting molds with complex geometry and which can also comprise, for example, thin-walled sections, wherein, after the metal casting, the cast piece obtained should already have a high surface quality, as reflected, for example, in less sand adhesion, burn-in of sand, penetration and discoloration.

This problem is solved with a molding material mixture having the features of the independent claims. Advantageous variants of the molding material mixture according to the invention are the subject matter of the dependent claims or are described below.

SUMMARY OF THE INVENTION

It was found surprisingly that by the addition of barium sulfate to the molding material mixture, casting molds based on inorganic binders can be produced which have high strength both immediately after the production and also after a prolonged storage. Furthermore, after the metal casting, a cast piece with very high surface quality is obtained, so that, after the removal of the casting mold, only minor or even no further processing of the surface of the cast piece is required. This advantage is associated with clearly lower costs for the production of the cast piece. According to an embodiment of the invention, the molding material mixture contains substantially no organic additives, i.e., up to a maximum of 0.2 wt %, or even no organic additives, so that only very minimal smoke generation, if any at all, is observed, which prevents pollution due to unhealthy emissions at the workplace for employees working there as well as for people living in surrounding areas. The use of the molding material mixture according to the invention also represents a contribution to reducing emissions that are detrimental to the climate (due to $CO_2$ and other organic pyrolysis products).

The molding material mixture according to the invention for producing casting molds for metal processing comprises at least:
a refractory basic molding material; as well as
a waterglass-based binder, and
barium sulfate.

DETAILED DESCRIPTION OF THE INVENTION

As refractory basic molding material it is possible to use the usual materials for producing casting molds. Suitable are, for example, quartz, zirconium or chrome sand, olivine, vermiculite, bauxite and fire clay, in particular more than 50 wt % of quartz sand relative to the refractory basic molding material. Here, it is not necessary to use exclusively fresh sands. In the sense of resource recycling and to avoid the costs of waste disposal, it is even advantageous to use the highest possible proportion of regenerated old sand.

The refractory basic molding material preferably comprises more than 80 wt %, in particular more than 90 wt % of the molding material mixture.

A suitable sand is described, for example, in WO 2008/101668 (=US 2010/173767 A1). Also suitable are regenerates which are obtained by washing and subsequent drying. Usable, but less preferable, are regenerates obtained by purely mechanical treatment. As a rule, the regenerates can replace at least approximately 70 wt % of the fresh sand, preferably at least approximately 80 wt %, and particularly preferably at least approximately 90 wt %.

Moreover, as refractory basic molding materials, synthetic molding materials can also be used, such as, for example, glass beads, glass granulate, the spherical ceramic basic molding materials known under the name "cerabeads" or "carboaccucast" or aluminum silicate hollow microspheres (so-called microspheres). Such aluminum silicate hollow microspheres are marketed, for example, by Omega Minerals German GmbH, Norderstedt, in different grades with different contents of aluminum oxide under name "Omega Spheres." Corresponding products are available under the name "Extendospheres" from the PQ Corporation (USA).

The mean diameter of the refractory basic molding material is as a rule between 100 µm and 600 µm, preferably between 120 µm and 550 µm, and particularly preferably between 150 µm and 500 gm. The particle size can be determined, for example, by sieving according to DIN ISO 3310. It is particularly preferable to use particle shapes having a largest lengthwise extension to smallest lengthwise extension (at right angles to one another and in each case for all the spatial directions) from 1:1 to 1:5 or 1:1 to 1:3, that is to say, for example, those that are not fibrous.

In casting tests, particularly with aluminum, it was found that synthetic basic molding materials, particularly glass beads, glass granulates or microspheres, can contribute to producing smoother cast surfaces. Here, it is not necessary to form the entire basic molding material from the synthetic basic molding materials.

The preferred content of the synthetic basic molding materials is here at least approximately 3 wt %, particularly preferably at least 5 wt %, especially preferably at least 10 wt %, preferably at least approximately 15 wt %, particularly preferably at least approximately 20 wt %, relative to the total quantity of the refractory basic molding material. The refractory basic molding material preferably exhibits a pourable state, in particular in order to be able to process the molding material mixture according to the invention in conventional core shooting machines.

The waterglasses contain dissolved alkali silicates and they can be produced by dissolution of vitreous lithium, sodium and potassium silicates in water. The waterglass preferably has a molar modulus $SiO_2/M_2O$ in the range from 1.6 to 4.0, in particular 2.0 to less than 3.5, where M stands for lithium, sodium or potassium.

The binders can also be based on waterglasses that contain more than one of the mentioned alkali ions such as, for example, the lithium-modified waterglasses known from DE 2652421 A1 (=GB1532847 A). The quantity of $M_2O$ results from the sum of all the alkali ions in the waterglass. Moreover, the waterglasses can also contain polyvalent ions, as do the Al-modified waterglasses described in EP 2305603 A1 (=WO 2011/042132 A1), for example.

The waterglasses have a solid matter content in the range from 25 to 65 wt %, preferably from 30 to 60 wt %. The solid matter content is the content of Si and M compounds in the waterglass, calculated as $SiO_2$ and $M_2O$. Depending on the use and desired strength level, between 0.5 wt % and 5 wt % of the binder based on waterglass is used, preferably between 0.75 wt % and 4 wt %, particularly preferably between 1 wt % and 3.5 wt %, in each case relative to the basic molding material. The indications are based on the total quantity of the waterglass binder, including the (in particular aqueous) solvents or diluents and the solid matter content (if any) (=100%).

The molding material mixture according to the invention contains barium sulfate. The barium sulfate can be added as synthetically manufactured or else natural barium sulfate, i.e., in the form of minerals that contain barium sulfate, such as heavy spar or barite. Synthetically manufactured barium sulfate (also referred to as blanc fixe) is produced, for example, by a precipitation reaction. For this purpose, readily soluble barium compounds (barium salts) are usually dissolved in water. Subsequently, by the addition of readily soluble sulfate salts, (such as sodium sulfate, for example), or else sulfuric acid, the sparsely soluble barium sulfate precipitates. The precipitated barium sulfate is removed by filtration, dried and optionally ground.

Natural barium sulfate is obtained as raw ore and subsequently processed by various methods (for example, density sorting, grinding, etc.). It is preferable for the barium sulfate to have a purity of more than 85 wt %, particularly preferably more than 90 wt %. The naturally obtained barium sulfate can contain, for example, silicon dioxide and calcium fluoride contaminants. Additional tests have shown that contaminants containing metal fluorides, in particular calcium fluoride, can lead to discoloration of the cast surface and to porosity. The content of fluoride-containing contaminants, in particular, calcium fluoride ($CaF_2$) as well as other metal fluorides, should accordingly be kept as small as possible in order not to affect the cast quality and surface.

It is advantageous for the total content of metal fluorides (including $CaF_2$) to be less than 6 wt %, preferably less than 3 wt %, particularly preferably less than 1 wt %, in each case relative to the total quantity of the naturally obtained barium sulfate used. It is particularly preferable for the barium sulfate according to the invention not to contain any metal fluoride contaminants (including calcium fluoride).

Preferably, the molding material composition claimed is free of metal fluoride, wherein this means that the molding material mixture contains less than 0.1 wt %, preferably less than 0.05 wt %, especially preferably less than 0.01 wt % metal fluoride.

The average particle size of the barium sulfate to be used according to the invention is preferably between 0.1 μm and 90 μm. The particle size distribution can be determined, for example, by dynamic light scattering (for example, Horiba LA 950). It is preferable for the sieve residue on a sieve having a mesh width of 45 μm to be less than 20 wt %, particularly preferably less than 10 wt %, especially preferably less than 5 wt %.

The barium sulfate is preferably added in a quantity from 0.02 to 5.0 wt %, particularly preferably 0.05 to 3.0 wt %, especially preferably 0.1 to 2.0 wt % or 0.3 to 0.99 wt %, in each case relative to the total molding material mixture. Surprisingly—also in view of the high density of the barium sulfate and the small volume per weight associated with it—even small added quantities—that is to say small volumes—added to the molding material mixture produce a clear increase in the surface quality of the cast piece in question. The positive influence of $BaSO_4$ on the quality of the cast surface is surprising to the person skilled in the art, since $BaSO_4$ is effective, even highly diluted by the fire-resistance substance, which is not true for other materials that are not wetted by NF metal melts. Graphite is mentioned as an example: due to its low wettability by molten aluminum, this material is also excellently suited for producing degassing pipes for NF metal melts (product description of SGL Carbon GmbH, Drachenburgstr. 1, 53170 Bonn/Germany).

As raw material for black wash coatings of cores and molds, graphite also produces a smoother cast surface already with very small layer thickness. However, it is not effective as sand additive, in contrast to $BaSO_4$. To add larger potentially effective quantities of graphite is not appropriate, because in that case the strengths of the molds and cores decrease so much that they can no longer be used for casting.

Other materials as well that are known for their low wettability, such as $Al_2O_3$, $ZrSiO_4$ or talc, show no positive effect as additive on the cast surface. Hexagonal boron nitride is another known additive with low wettability. It was observed that, while the addition of hexagonal boron nitride leads to improved qualities, it also leads to clearly reduced strengths—therefore the use of boron nitride is not preferable. $CaF_2$ is an additional additive with low wettability with NF metal melts, in particular aluminum melts. When using fluorides as additive for the molding material mixture, in particular $CaF_2$, relatively sand adhesion-free and smooth surfaces of the corresponding cast piece are indeed obtained; however, as a result of this use, particularly in the case of calcium fluoride, discoloration of the cast surface occurs, particularly if the cast piece is made of aluminum and/or aluminum alloys. However, these discolorations are undesirable and they suggest a reaction of the metal with a fluoride-containing material—therefore the use of $CaF_2$ is also not preferable.

In summary, it was thus possible to observe that only the addition of barium sulfate to the molding material mixture both produces a substantial improvement of the surface quality of the cast piece (for example, with regard to reduced sand adhesion, burn-in of sand, penetration and also discoloration) and also ensures the strength level required for automated series production, in particular a suitable hot strength. These effects were very surprising to the person skilled in the art. The complete mechanism of action of barium sulfate has not been elucidated.

According to a further embodiment, it is also possible to add other substances to the molding material mixture, which are characterized by low wetting with molten aluminum, such as boron nitride, for example.

Such a mixture of low-wetting substances, which contains barium sulfate, among other substances, as low-wetting agent, can also lead to a smooth, sand adhesion-free cast surface. Relative to the total quantity of non-wetting or low-wetting substances, the content of barium sulfate should be higher than 5%, preferably higher than 10 wt %, especially preferably higher than 20 wt % or higher than 60 wt %. The upper limit represents pure barium sulfate—proportion of barium sulfate relative to non-wetting agents in this case is 100 wt %. The non-/low-wetting substance mixture is preferably added in a quantity from 0.02 to 5.0 wt %, particularly preferably 0.05 to 3.0 wt %, especially preferably 0.01 to 2.0 wt % or 0.3 to 0.99 wt %, in each case relative to the molding material mixture.

In a further preferred embodiment, a particulate metal oxide can be added to the molding material mixture according to the invention, in order to increase the strength level of the casting molds produced with such molding material mixtures. An increase in the strengths of the casting mold, in particular an increase in the hot strengths, can be advantageous in the automated manufacturing process. The particulate metal oxides can be selected from the group of silicon oxides, aluminum oxides, titanium oxides and zinc oxides and their mixtures or mixed oxides, in particular silicon dioxide, aluminum oxide and/or aluminosilicates. The particle size of these metal oxides is preferably less than 300 μm, preferably less than 200 μm, especially preferably less than 100 μm, and it has, for example, a mean primary particle size between 0.05 μm and 10 μm.

The particle size can be determined by a sieve analysis. It is particularly preferable for the sieve residue on a sieve with a mesh width of 63 μm to be less than 10 wt %, preferably less than 8 wt %. It is particularly preferable to use silicon dioxide as particulate metal oxide, wherein synthetically produced amorphous silicon dioxide is particularly preferred here.

The amorphous $SiO_2$ preferably used according to the present invention has a water content of less than 15 wt %, in particular less than 5 wt %, and particularly preferably less than 1 wt %. The amorphous $SiO_2$ is used in particular in powder form.

As amorphous $SiO_2$ it is possible to use both synthetically produced and also naturally occurring silicas. However, the latter, known from DE 102007045649, for example, are not preferable, since they include as a rule not inconsiderable crystalline contents and are therefore classified as carcinogens.

Synthetic denotes non-naturally occurring amorphous $SiO_2$, i.e., the preparation thereof includes a chemical reaction, for example, the preparation of colloidal silica by ion exchange processes from alkali silicate solutions, precipitation of alkali silicate solutions, flame hydrolysis of silicon tetrachloride or reduction of quartz sand with coke in the electric arc furnace in the preparation of ferrosilicon and silicon. The amorphous $SiO_2$ produced by the last two mentioned processes is also referred to as pyrogenic $SiO_2$.

Occasionally, the term synthetic amorphous $SiO_2$ is understood to represent only precipitation silica (CAS No. 112926-00-8) and $SiO_2$ produced by flame hydrolysis (Pyrogenic Silica, Fumed Silica, CAS No. 112945-52-5), whereas the product obtained in ferrosilicon or silicon preparation is just referred to as amorphous $SiO_2$ (Silica Fume, Microsilica, CAS No. 69012-64-12). For the purposes of the present invention, the product produced in ferrosilicon or silicon preparation is also understood to refer to synthetic amorphous $SiO_2$.

It is preferable to use precipitation silicas and pyrogenic $SiO_2$, i.e., that has been produced by flame hydrolysis or in the electric arc. The mean primary particle size of the synthetic amorphous silicon dioxide can be between 0.05 μm and 10 μm, in particular between 0.1 μm and 5 μm, particularly preferably between 0.1 μm and 2 μm. The primary particle size can be determined, for example, using dynamic light scattering (for example, Horiba LA 950) and checked by scanning electron microscope views (SEM views with, for example, Nova NanoSEM 230 from the company FEI). Moreover, using the SEM views, details of the primary particle form up to the order of magnitude of 0.01 μm can be made visible. The $SiO_2$ samples were dispersed in distilled water for the SEM measurements and subsequently applied to an aluminum holder to which a copper band was stuck, before the water was evaporated.

Moreover, the specific surface area of synthetic amorphous silicon dioxide is determined by gas adsorption measurements (BET method) according to DIN 66131. The specific surface area of synthetic amorphous $SiO_2$ is between 1 and 200 $m^2/g$, in particular between 1 and 50 $m^2/g$, particularly preferably between 1 and 30 $m^2/g$. Optionally, the product can also be mixed, for example, in order to obtain in a controlled manner mixtures with certain particle size distributions.

By agglomeration, the mentioned amorphous $SiO_2$ types readily form larger aggregates. For a uniform distribution of the amorphous $SiO_2$ in the molding material mixture, it is optionally advantageous if the aggregates break up again partially into smaller units during the mixing or from the beginning do not exceed a certain size. It is preferable for the residue—for the purpose of describing the extent of the agglomeration—after passage through a sieve of mesh width 45 μm (325 mesh) to be not more than approximately 10 wt %, particularly preferably not more than approximately 5 wt %, and most particularly preferably not more than approximately 2 wt %.

Depending on the manufacturing type and producer, the purity of the amorphous $SiO_2$ can vary strongly. Types having a content of at least 85 wt % $SiO_2$, preferably at least 90 wt % and particularly preferably of at least 95 wt % have been found to be suitable. Depending on the use and the desired strength level, between 0.1 wt % and 2 wt % of particulate amorphous $SiO_2$ is used, preferably between 0.1 wt % and 1.8 wt %, particularly preferably between 0.1 wt % and 1.5 wt %, in each case in reference to the basic molding material.

The ratio of waterglass binder to particulate metal oxide and in particular to amorphous $SiO_2$ can vary within broad limits. This offers the advantage of strongly improving the initial strength of the cores, i.e., the strength immediately after the removal from the tool, without substantially influencing the final strengths. This is of great interest particularly in light metal casting. On the one hand, high initial strengths are desirable, in order to be able to transport the cores without problem after their manufacture or to be able to assemble them into complete core packets, and, on the other hand, the final strengths should not be excessively high in order to prevent difficulties at the time of the disintegration of the core after the casting, i.e., it should be possible after the casting to remove the basic molding material without problem from the hollow spaces of the casting mold.

Relative to the weight of the binder (including diluent and solvent), the amorphous $SiO_2$ is obtained preferably at a content from 2 to 60 wt %, particularly preferably from 3 to 55 wt %, and particularly preferably between 4 to 50 wt %, or respectively particularly preferably from 10:1 to 1:1.2 (parts by weight) relative to the ratio of solid matter content of the waterglass to amorphous $SiO_2$.

The addition of the amorphous $SiO_2$, according to EP 1802409 B1, can occur both before and also after the binder addition directly to the refractory material; however, as described in EP 1884300 A1 (=US 2008/029240 A1), a preliminary mix of $SiO_2$ with a portion of the binder or sodium hydroxide solution can be produced first and then admixed to the refractory material. Any binder or binder content that is still present and has not been used for the preliminary mixture can then be added to the refractory substance, before or after the addition of the premix or together with said mix. The amorphous $SiO_2$ is preferably added to the refractory material before the binder addition.

The content of synthetic amorphous silicon dioxide, relative to the total weight of the binder, is preferably from 1 to 80 wt %, preferably between 2 and 60 wt %, especially preferably between 3 and 50 wt %.

In a further embodiment, the molding material mixture according to the invention can include a phosphorus-containing compound. This additive is preferable in the case of very thin-walled sections of a casting mold. It is preferable here to use inorganic phosphorus compounds in which the phosphorus is preferably at oxidation level +5. As a result of the addition of phosphorus-containing compounds, the stability of the casting mold can be increased further. This is of importance particularly if, during the metal casting, the liquid metal strikes a slanted surface and has a high erosion action there due to the high metallostatic pressure, and can lead to deformations in particular of thin-walled sections of the casting mold.

The phosphorus-containing compound is preferably in the form of a phosphate or phosphorus oxide. The phosphate here can be in the form of an alkali or alkaline earth phosphate, wherein alkali metal phosphates and here in particular sodium salts are particularly preferable.

In principle, ammonium phosphates or phosphates of other metal ions can also be used. However, the alkali and alkaline earth metal phosphates mentioned as preferable are easily accessible and available cost effectively in any desired quantities. Phosphates of polyvalent metal ions, particularly of trivalent metal ions, are not preferable. It has been observed that when using such phosphates of polyvalent metal ions, in particular of trivalent metal ions, the processing time of the molding material mixture is shortened. If the phosphorus-containing compound is added to the molding material mixture in the form of a phosphorus oxide, the phosphorus is preferably in the form of phosphorus pentoxide. However, phosphorus tri- and phosphorus tetraoxide can also be used.

As phosphates, both orthophosphates and also polyphosphates, pyrophosphates or metaphosphates can be used. The phosphates can be produced, for example, by neutralization of the corresponding acids with a corresponding base, for example, an alkali metal base such as NaOH, or possibly also an alkaline earth metal base, wherein all the negative charges of the phosphate do not necessarily have to be saturated with metal ions. It is possible to use both metal phosphates and also metal hydrogen phosphates as well as metal dihydrogen phosphates such as, for example, $Na_3PO_4$, $Na_2HPO_4$, and $NaH_2PO_4$. The anhydrous phosphates as well as hydrates of phosphates can be used equally. The phosphates can be introduced both in crystalline and also in amorphous form into the molding material mixture.

Polyphosphates denote in particular linear phosphates that include more than one phosphorus atom, wherein the phosphorus atoms in each case are bound to one another via oxygen bridges. Polyphosphates are obtained by the condensation of orthophosphate ions with water cleavage, so that a linear chain of $PO_4$ tetrahedra is obtained, tetrahedra which in each case are connected via corners. Polyphosphates have the general formula $(O(PO_3)^{(n+2)-}$, wherein n corresponds to the chain length. A polyphosphate can include up to several hundred $PO_4$ tetrahedra. However, it is preferable to use polyphosphates with shorter chain lengths. It is preferable for n to have values from 2 to 100, especially preferably 5 to 50. It is also possible to use higher condensed polyphosphates, i.e., polyphosphates in which the $PO_4^-$ tetrahedra are connected to one another via more than two corners and therefore exhibit polymerization in two or three dimensions.

Metaphosphates denote cyclic structures which are constructed from $PO_4^-$ tetrahedra in each case connected to one another via corners. Metaphosphates have the general formula $((PO3)n)^{n-}$ where n is at least 3. n preferably has values from 3 to 10.

It is possible to use either individual phosphates or also mixtures of different phosphates and/or phosphorus oxides.

The preferred content of the phosphorus-containing compound, relative to the refractory basic molding material, is between 0.05 and 1.0 wt %. In the case of a content of less than 0.05 wt %, no clear influence on the mold strength of the casting mold can be observed. If the content of the phosphate exceeds 1.0 wt %, the hot strength of the casting mold decreases considerably. It is preferable for the content of the phosphorus-containing compound to be selected between 0.1 and 0.5 wt %. The phosphorus-containing inorganic compound preferably contains between 40 and 90 wt %, especially preferably between 50 and 80 wt % phosphorus, calculated as $P_2O_5$. The phosphorus-containing compound itself can be added in solid or dissolved form to the molding material mixture. It is preferable to add the phosphorus-containing compound as a solid to the molding material mixture. If the phosphorus-containing compound is added in dissolved form, water is preferable as solvent.

As an additional advantage of an addition of phosphorus-containing compounds to molding material mixtures for producing casting molds, it was found that the molds exhibit very good disintegration after the metal casting. This applies particularly to metals that require lower casting temperatures, such as light metals, in particular aluminum. During iron casting, higher temperatures of more than 1200° C. act on the casting mold, so that there is an increased risk of vitrification of the casting mold and thus of a worsening of the disintegration properties.

In a further embodiment, an organic compound (according to EP 1 802 409 B1 and WO 2008/046651) can be added to the molding material mixture according to the invention. A smaller addition of organic compounds can be advantageous for special applications—for example, in order to further improve the core removal behavior. However, such an addition is not preferable, because this again is associated with emissions of $CO_2$ and other pyrolysis products.

In comparison to binders based on organic solvents, binders that contain water generally have a poorer fluidity. This means that it is more difficult to fill molding tools having narrow passages and several bypasses. Consequently, the cores can have sections with insufficient sealing, which in turn can lead to casting defects during casting. According to an advantageous embodiment, the molding material mixture according to the invention contains a content of plate-like lubricants, in particular graphite or $MoS_2$. It has been found surprisingly that, in the case of an addition of such lubricants, in particular of graphite, complex shapes with thin-walled sections can also be produced, wherein the casting molds have a uniform high density and strength so that substantially no casting defects have been observed during the casting. The quantity of the added plate-like lubricant, in particular graphite, is preferably 0.05 to 1 wt %, particularly preferably 0.05 to 0.5 wt %, relative to the basic molding material.

Instead of the plate-like lubricants, surface-active substances, in particular surfactants, can also be used, which improve the fluidity of the molding material mixture. Suitable representatives of these compounds are described, for example, in WO 2009/056320 (=US 2010/0326620 A1). Mentioned here are in particular surfactants with sulfuric acid or sulfonic acid groups. A surface active substance denotes a substance that can form a monomolecular layer on an aqueous surface, and is thus capable of forming a membrane, for example. Furthermore, by means of a surface-active substance, the surface tension of water is lowered. Suitable surface-active substances are silicone oils, for example.

The surface-active substance is particularly preferably a surfactant. Surfactants comprise a hydrophilic part and a hydrophobic part, which are adapted in terms of their properties so that in an aqueous phase the surfactants form micelles, for example, or they can accumulate on the boundary surface.

All the classes of surfactants themselves can be used in the molding material mixture according to the invention. Suitable are, in addition to anionic surfactants, also nonionic surfactants, cationic surfactants as well as amphoteric surfactants.

Examples of nonionic surfactants are, for example, ethoxylated or propoxylated long-chain alcohols, amines or acids, such as fatty alcohol ethoxylates, alkyl phenol ethoxylates, fatty amine ethoxylates, fatty acid ethoxylates, the corresponding propoxylates and also sugar surfactants such as fatty alcohol-based polyglycosides, for example. The fatty alcohols preferably comprise 8 to 20 carbon atoms. Suitable cationic surfactants are alkylammonium compounds and imidazolinium compounds.

It is preferable to use anionic surfactants for the molding material mixture according to the invention. The anionic surfactant preferably comprises, as polar hydrophilic group, a sulfate, sulfonate, phosphate or carboxylate group, wherein sulfate and phosphate groups are particularly preferable. If sulfate group-containing anionic surfactants are used, it is preferable to use monoesters of sulfuric acid. If phosphate groups are used as polar group of the anionic surfactant, it is particularly preferable to use mono- and diesters of orthophosphoric acid.

The surfactants used in the molding material mixture according to the invention share the property that the apolar, hydrophobic section is preferably formed from alkyl, aryl and/or aralkyl groups comprising preferably more than 6 carbon atoms, particularly preferably 8 to 20 carbon atoms. The hydrophobic section can comprise both linear chains and also branched structures. Mixtures of different surfactants can also be used equally.

Particularly preferable anionic surfactants are selected from the group of oleyl sulfate, stearyl sulfate, palmityl sulfate, myristyl sulfate, lauryl sulfate, decyl sulfate, octyl sulfate, 2-ethylhexyl sulfate, 2-ethoxyoctyl sulfate, 2-ethyldecyl sulfate, palmitoleyl sulfate, linolyl sulfate, lauryl sulfonate, 2-ethyldecyl sulfonate, palmityl sulfonate, stearyl sulfonate, 2-ethylstearyl sulfonate, linolyl sulfonate, hexyl phosphate, 2-ethylhexyl phosphate, capryl phosphate, lauryl phosphate, myristyl phosphate, palmityl phosphate, palmitoleyl phosphate, oleyl phosphate, stearyl phosphate, poly(1,2-ethandiyl-)phenol hydroxy phosphate, poly(1,2-ethandiyl-)stearyl phosphate, and poly(1,2-ethandiyl-)oleyl phosphate.

In the molding material mixture according to the invention the content of the pure surfactant substance, relative to the weight of the refractory basic molding material, is preferably 0.001 to 1 wt %, particularly preferably 0.01 to 0.2 wt %. Frequently, such surfactant substances are commercially available in the form of a 20 to 80% solution. In this case, the aqueous solutions of the surfactant substances are particularly preferable.

In principle, the surfactant substance can be added either in dissolved form, for example, in the binder, as separate component, or, on the other hand, via a solid component which functions as carrier material in an additive added, for example, to the molding material mixture. It is particularly preferable for the surfactant substance to be dissolved in the binder.

In addition to the mentioned components, the molding material mixture according to the invention can also include further additives. For example, internal separation agents can be added, which facilitate the detachment of the casting molds from the molding tool. Suitable internal separation agents are, for example, calcium stearate, fatty acid esters, waxes, natural resins or special alkyd resins.

Furthermore, silanes can also be added to the molding material mixture according to the invention, in order to increase the resistance of the molds and cores to high air humidity and/or to water based molding material coatings. According to a further preferred embodiment, the molding material mixture according to the invention contains a proportion of at least one silane. Suitable silanes are, for example, aminosilanes, epoxysilanes, mercaptosilanes, hydroxysilanes and ureidosilanes. Examples of suitable silanes are aminopropyltrimethoxysilane, hydroxypropyltrimethoxysilane, 3-ureidopropyltriethoxysilane, mercaptopropyltrimethoxysilane, glycidoxypropyltrimethoxysilane (3,4-epoxycyclohexyl)trimethoxysilane and N-(aminoethyl)aminopropyltrimethoxysilane. Based on the binder, it is typical to use 0.1 to 2 wt % silane, preferably 0.1 to 1 wt %. Further suitable additives are alkali metal siliconates, for example, potassium methyl siliconate, of which 0.5 to 15 wt %, preferably 1 to 10 wt %, and particularly preferably 1 to 5 wt % relative to the binder can be used. If the molding material mixture contains silanes and/or alkali methyl siliconates, then their addition usually occurs in the mold, so that they can be incorporated from the start in the binder. However, they also can be added to the molding material as separate component.

The molding material mixture according to the invention represents an intensive mixture consisting at least of the mentioned components. Here, the particles of the refractory basic molding material are preferably coated with a layer of the binder. By evaporating the water (approximately 40-70 wt %, relative to the weight of the binder) present in the binder, a firm cohesion between the particles of the refractory basic molding material can be achieved.

In spite of the high strengths that can be achieved with the binder system according to the invention, the casting molds prepared with the molding material mixture according to the invention surprisingly have a particularly good disintegration after casting, particularly in the case of aluminum casting. As already mentioned, it has also been found that with the molding material mixture according to the invention casting molds can be produced that exhibit very good disintegration even in the case of iron casting, so that the molding material mixture, after casting, can be poured out without problem even from narrow and angular sections of the casting mold. The use of the mold body prepared from the molding material mixture according to the invention is therefore not limited only to light metal casting. The casting molds are suitable in general for casting metals such as nonferrous or ferrous metals, for example. However, the molding material mixture according to the invention is particularly suitable for casting aluminum.

The invention further relates to a method for producing casting molds for metal processing, wherein the molding material mixture according to the invention is used. The method according to the invention comprises the steps:

Preparing the above-described molding material mixture;
Molding the molding material mixture;
Curing the molded molding material mixture, wherein the cured casting mold is obtained.

In the preparation of the molding material mixture according to the invention, the procedure generally is to first use the refractory basic molding material as starting material and then add the binder under stirring. Here, the waterglass as well as the powdered barium sulfate can be added in any order.

The above-described additives themselves can be added in any form to the molding material mixture. They can be added individually or also as a mixture. According to a preferred embodiment, the binder is produced as a two-component system, wherein a first liquid component contains the waterglass and optionally a surfactant (see above), and a second solid component comprise the powdered barium sulfate, and optionally the particulate metal oxide, in particular the synthetic amorphous silicon dioxide and optionally a phosphate and optionally a preferably plate-like lubricant and optionally an organic compound.

In the preparation of the molding material mixture, the refractory basic molding material is placed as starting material in a mixer, and then preferably first the solid component(s) of the binder is/are added and mixed with the refractory basic molding material. The mixing duration is selected so that a thorough mixing of refractory basic molding material and solid binder components occurs. The mixing duration depends on the quantity of the molding material mixture to be prepared as well as on the mixing unit used. It is preferable for the mixing duration to be selected between 1 and 5 minutes. Under preferably continued movement of the mixture, the liquid component of the binder is then added and then the mixture continues to be mixed until a uniform layer of the binder has formed on the grains of the refractory basic molding material. Here too, the mixing duration depends on the quantity of the molding material mixture to be prepared as well as on the mixing unit used. It is preferable for the duration for the mixing process to be selected between 1 and 5 minutes. A liquid component denotes both a mixture of different liquid components and also the totality of all the individual liquid components, wherein the latter can also be added individually. A solid component also denotes the mixture of individual solid components or all of the above-described solid components as well as the totality of all the individual solid components, wherein the latter can be added together or one after the other to the molding material mixture. According to another embodiment, the liquid component of the binder can also be added first to the refractory basic molding material, and solid components are only added to the mixture thereafter. According to an additional embodiment, first 0.05 to 0.3% water, relative to the weight of the basic molding material, is added to the refractory basic molding material and it is only thereafter that the solid and liquid components of the binder are added.

In this embodiment, a surprisingly positive effect on the processing time of the molding material mixture can be achieved. The inventors assume that the water-withdrawing effect of the solid component of the binder is reduced in this manner and the curing process is delayed as a result. The molding material mixture is subsequently brought to the desired shape. Here, the usual methods are used for the shaping. For example, the molding material mixture can be shot into the molding tool by means of a core shooting machine using pressurized air. The molding material mixture is subsequently cured, wherein all the methods can be used that are known for binders based on waterglass, for example, heat curing, gassing with $CO_2$ or air or a combination of the two as well as curing by means of liquid and solid catalysts.

During hot curing, water is removed from the molding material mixture. As a result, condensation reactions between silanol groups are presumably also initiated, so that a crosslinking of the waterglass occurs.

The heating can occur, for example, in the molding tool. It is possible to cure the casting mold completely already in the molding tool. However, it is also possible to cure the casting mold only in its marginal area, so that it has sufficient strength to be removed from the molding tool. The casting mold can subsequently be cured completely by removing the additional water it contains from it. This can occur in an oven, for example. The water removal can also occur, for example, by evaporating the water at reduced pressure.

The curing of the casting mold can be accelerated by injecting heated air into the molding tool. In this embodiment of the method, a rapid transport away of the water contained in the binder is achieved, as a result of which the casting mold solidifies within time periods suitable for industrial use. The temperature of the injected air is preferably 100° C. to 180° C., especially preferably 120° C. to 150° C. The flow rate of the heated air is preferably adjusted so that a curing of the casting mold occurs within time periods suitable for industrial use. The time periods depend on the size of the casting molds produced. The aim is to achieve curing within a time period of less than 5 minutes, preferably less than 2 minutes. However, in the case of very large casting molds, longer time periods can also be required.

The removal of the water from the molding material mixture can also be carried out in such a manner that the heating of the molding material mixture is achieved by microwave irradiation. However, the microwave irradiation is preferably carried out after the casting mold has been removed from the molding tool. However, for this purpose, the casting mold must already have sufficient strength. As already explained, this can be achieved, for example, by curing at least an outer shell of the casting mold already in the molding tool.

The methods according to the invention are suitable per se for producing all casting molds used conventionally in metal casting, that is to say, for example, cores and molds. Here, casting molds that comprise very small thin-walled sections can also be produced particularly advantageously.

The casting molds produced from the molding material mixture according to the invention or by the methods according to the invention have a high strength immediately after production, without the strength of the casting molds after the curing reaching such a high level that difficulties occur after the production of the cast piece at the time of the removal of the casting mold. Moreover, these casting molds have a high stability at increased air humidity, i.e., the casting molds can surprisingly be stored without problem even for a prolonged duration. As an advantage, the casting mold has a very high stability under mechanical stress, so that thin-walled sections of the casting mold can also be produced without said sections undergoing deformation due to metallostatic pressure during the casting process. Therefore, an additional subject matter of the invention is a casting mold which is obtained by the above-described method according to the invention.

The casting mold according to the invention is generally suitable for metal casting, in particular light metal casting. Particularly advantageous results are obtained in aluminum casting.

Moreover, the invention is explained further in reference to examples without being limited to them.

EXAMPLES

1) Influence of Different Molding Material Mixtures on the Bending Strengths

For testing the molding material mixture, so-called Georg-Fischer test bars were produced. Georg-Fischer test bars are rectangular test bars having the dimensions 150 mm×22.36 mm×22.36 mm. The compositions of the molding material mixtures are indicated in Table 1. The procedure for producing the Georg-Fischer test bars was as follows:

The components listed in Table 1 are mixed in a laboratory blade mixer (company Vogel & Schemmann A G, Hagen, D E). For this purpose, the quartz sand was first introduced as starting material, and the waterglass was added under stirring. As waterglass, a sodium waterglass was used which contained proportions of potassium. In the following table, the modulus is therefore indicated with $SiO_2:M_2O$, wherein M indicates the sum of sodium and potassium. After the mixture had been stirred for one minute, amorphous $SiO_2$ and/or barium sulfate was/were optionally added under continued stirring. The mixture was subsequently stirred for another minute.

The molding material mixtures were transferred to the storage hopper of an H 2.5 Hot Box core shooting machine from the company Röperwerk— Gießereimaschinen GmbH, Viersen, D E, whose molding tool had been heated to 180° C.;

The molding material mixtures were introduced by means of pressurized air (5 bar) into the mold and they remained for an additional 35 seconds in the molding tool;

For the acceleration of the curing of the mixtures, hot air (2 bar, 100° C. at the inlet into the tool) was led through the molding tool during the last 20 seconds;

The molding tool was opened and the test bar removed.

For the determination of the bending strengths, the test bars were introduced into a Georg-Fischer strength testing apparatus provided with a 3-point bending device (DISA Industrie AG, Schaffhausen, C H) and the force that led to the break of the test bar was measured. The bending strengths were measured according to the following scheme:

10 seconds after the removal (hot strengths)

1 hour after removal (cold strengths)

The indexes in Table 1 have the following meaning:

[a] Alkali waterglass with a weight modulus $SiO_2:M_2O$ of approximately 2.1; relative to the total waterglass. Solid matter content approximately 35%

[b] Microsilica white GHL DL971W (amorphous SiO2, company RW silicium GmbH; originating from the metallurgical production of silicon in the electric arc furnace)

[c] Heavy spar powder C11 (natural barium sulfate, company Sachtleben Bergbau GmbH & Co KG)

[d] Barium sulfate (precipitated, company Sigma Aldrich)

[e] Boronid SCP1 (boron nitride, company ESK Ceramics GmbH & Co. KG)

[f] Boronid S6 (hexagonal boron nitride, company ESK Ceramics GmbH & Co. KG)

[g] Boronid S12 (hexagonal boron nitride, company ESK Ceramics GmbH & Co. KG)

[h] Corundum (corundum, company Treibacher Schleifmittel)

[i] Talc H100 (company Franz Mandt GmbH & Co. KG)

[k] Gloss powder graphite 85 (company Technografit GmbH)

[l] Zirconium silicate (company Cofermin Rohstoffe GmbH & Co. KG)

The measured bending strengths are summarized in Table 2.

Examples 1.01 to 1.10 illustrate that the strength level required for automated series manufacture can be reached if a synthetic amorphous silicon dioxide is added to the molding material mixture. The addition of different quantities of barium sulfate alone does not lead to the required increase in strengths, in particular the hot strengths. By combining synthetic amorphous silicon dioxide with barium sulfate (Examples 1.7 to 1.10), on the other hand, strength levels can be achieved that are comparable to those of solid matter mixtures to which only synthetic amorphous silicon dioxide has been added (Example 1.02). Furthermore, it is clear that it is advantageous if the addition of barium sulfate is not so high that the strengths, in particular the hot strengths, decrease in the case of increased added quantities.

A comparison of Examples 1.07 with 1.11 shows that it makes no difference whether natural or synthetic barium sulfate is used. The Examples 1.07, 1.11 to 1.18 demonstrate that good strength levels (in particular immediate strengths) can be achieved with the additives $BaSO_4$, corundum, talc, zirconium silicate and graphite. On the other hand, additions of boron nitride (independently of the particle sizes, etc., Examples 1.12-1.14) to respective molding material mixtures clearly show reduced strength levels, in particular immediate strengths.

TABLE 1

Compositions of the molding material mixtures

| | Quartz sand H32 | Alkali waterglass | Amorphous SiO$_2$ | Barium sulfate | Other additives | |
|---|---|---|---|---|---|---|
| 1.01 | 100 GT | 2.0 GT$^{a)}$ | — | — | — | Comparison |
| 1.02 | 100 GT | 2.0 GT$^{a)}$ | 0.5 GT$^{b)}$ | — | — | Comparison |
| 1.03 | 100 GT | 2.0 GT$^{a)}$ | — | 0.3 GT$^{c)}$ | — | Comparison, not according to the invention |
| 1.04 | 100 GT | 2.0 GT$^{a)}$ | — | 0.5 GT$^{c)}$ | — | Comparison, not according to the invention |
| 1.05 | 100 GT | 2.0 GT$^{a)}$ | — | 1.0 GT$^{c)}$ | — | Comparison, not according to the invention |
| 1.06 | 100 GT | 2.0 GT$^{a)}$ | — | 2.0 GT$^{c)}$ | — | Comparison, not according to the invention |
| 1.07 | 100 GT | 2.0 GT$^{a)}$ | 0.5 GT$^{b)}$ | 0.3 GT$^{c)}$ | — | According to the invention |
| 1.08 | 100 GT | 2.0 GT$^{a)}$ | 0.5 GT$^{b)}$ | 0.5 GT$^{c)}$ | — | According to the invention |
| 1.09 | 100 GT | 2.0 GT$^{a)}$ | 0.5 GT$^{b)}$ | 1.0 GT$^{c)}$ | — | According to the invention |
| 1.10 | 100 GT | 2.0 GT$^{a)}$ | 0.5 GT$^{b)}$ | 2.0 GT$^{c)}$ | — | According to the invention |
| 1.11 | 100 GT | 2.0 GT$^{a)}$ | 0.5 GT$^{b)}$ | 0.3 GT$^{d)}$ | — | According to the invention |
| 1.12 | 100 GT | 2.0 GT$^{a)}$ | 0.5 GT$^{b)}$ | — | 0.3 GT$^{e)}$ | Comparison |
| 1.13 | 100 GT | 2.0 GT$^{a)}$ | 0.5 GT$^{b)}$ | — | 0.3 GT$^{f)}$ | Comparison |
| 1.14 | 100 GT | 2.0 GT$^{a)}$ | 0.5 GT$^{b)}$ | — | 0.3 GT$^{g)}$ | Comparison |
| 1.15 | 100 GT | 2.0 GT$^{a)}$ | 0.5 GT$^{b)}$ | — | 0.3 GT$^{h)}$ | Comparison |
| 1.16 | 100 GT | 2.0 GT$^{a)}$ | 0.5 GT$^{b)}$ | — | 0.3 GT$^{i)}$ | Comparison |
| 1.17 | 100 GT | 2.0 GT$^{a)}$ | 0.5 GT$^{b)}$ | — | 0.3 GT$^{k)}$ | Comparison |
| 1.18 | 100 GT | 2.0 GT$^{a)}$ | 0.5 GT$^{b)}$ | — | 0.3 GT$^{l)}$ | Comparison |

Comparison = not according to the invention

TABLE 2

Bending strengths

| | Hot strengths [N/cm$^2$] | Strengths after 1 h [N/cm$^2$] | |
|---|---|---|---|
| 1.01 | 90 | 380 | Comparison, not according to the invention |
| 1.02 | 150 | 470 | Comparison, not according to the invention |
| 1.03 | 95 | 365 | Comparison, not according to the invention |
| 1.04 | 100 | 360 | Comparison, not according to the invention |
| 1.05 | 100 | 350 | Comparison, not according to the invention |
| 1.06 | 100 | 300 | Comparison, not according to the invention |
| 1.07 | 160 | 460 | According to the invention |
| 1.08 | 140 | 470 | According to the invention |
| 1.09 | 140 | 440 | According to the invention |
| 1.10 | 125 | 410 | According to the invention |
| 1.11 | 145 | 480 | According to the invention |
| 1.12 | 95 | 345 | Comparison, not according to the invention |
| 1.13 | 100 | 315 | Comparison, not according to the invention |
| 1.14 | 100 | 340 | Comparison, not according to the invention |
| 1.15 | 150 | 470 | Comparison, not according to the invention |
| 1.16 | 135 | 460 | Comparison, not according to the invention |
| 1.17 | 130 | 410 | Comparison, not according to the invention |
| 1.18 | 155 | 460 | Comparison, not according to the invention |

2) Improvement of the Cast Surface

The influence of barium sulfate as molding material additive on the cast surface was investigated and evaluated in comparison to the molding material mixtures that are not according to the invention. For this purpose, the following procedure was used:

Georg-Fischer test bars of the molding material mixtures 1.01 to 1.18 in Table 1 were incorporated in a sand casting mold in such a manner that during the casting process three of the four longitudinal sides come in contact with the casting metal.

The casting was carried out with an aluminum alloy of type 226 at a casting temperature of approximately 735° C.

After cooling the casting mold, the cast piece was rid of sand by high-frequency hammer strikes.

The cast pieces were subsequently evaluated with regard to remaining sand adhesion and roughness.

The cast sections from mixtures 1.01 and 1.02 clearly show more sand adhesion than those from mixtures 1.03 to 1.11. The positive effect of barium sulfate on the cast surfaces becomes very clear here. In addition, a comparison of the cast surface for mixtures 1.07 and 1.11 also shows that the desired effect is achieved both with natural and also with synthetic barium sulfate. Whether synthetic or natural barium sulfate is used apparently plays no role.

A comparison to the cast sections from mixtures 1.07 and 1.11 to 1.18 shows that only the additions of barium sulfate or hexagonal boron nitride lead to improved surfaces. No or hardly any improvement of the surface can be observed when other additives (corundum, talc, graphite, zirconium silicate) are used.

The invention claimed is:

1. A molding material mixture for producing casting molds for metal processing, comprising:
   a refractory basic molding material,
   a binder based on water glass, present in the range of 0.5 to 5.0 wt %, the solid content of the water glass being in the range of 25 to 65 wt %;
   barium sulfate, present in the range of 0.02 to 5.0 wt %;
   particulate synthetic amorphous $SiO_2$, present in the range of 0.1 to 2 wt %; and
   wherein all weight percentages, except for the solid content of the water glass and the barium sulfate are based on the basic molding material.

2. The molding material mixture according to claim 1, wherein the barium sulfate has a mean particle size between 0.1 μm and 90 μm.

3. The molding material mixture according to claim 1, wherein the molding material mixture contains at most 0.2 wt % organic compounds.

4. The molding material mixture according to claim 1, wherein the water glass has a molar modulus $SiO_2/M_2O$ from 1.6 to 4.0, where M stands for lithium, sodium and potassium.

5. The molding material mixture according to claim 1, wherein the particulate synthetic amorphous $SiO_2$ has a mean primary particle size between 0.05 μm and 10 μm, and, independently thereof, has a BET surface area from 1 to 200 $m^2/g$.

6. The molding material mixture according to claim 1, wherein the synthetic amorphous $SiO_2$ used has a water content of less than 15 wt %, and independently is used in particular in powder form.

7. The molding material mixture according to claim 1, further comprising at least one anionic surfactant.

8. The molding material mixture according to claim 7, wherein the content of the surfactant, relative to the weight of the refractory basic molding material, is from 0.001 to 1 wt %, in the molding material mixture.

9. The molding material mixture according to claim 1, further comprising graphite.

10. The molding material mixture according to claim 1, further comprising at least one phosphorus-containing compound.

11. A method for producing casting molds or cores, comprising the steps of:
    preparing a molding material mixture according to claim 1;
    introducing the molding material mixture into a mold, and
    curing the molding material mixture by removing water by applying heat.

12. The method according to claim 11, wherein, for introducing the molding material mixture into the mold, a core shooting machine with pressurized air is used, where the mold is a molding tool, and at least one gas is run through the molding tool.

13. The method according to claim 11, wherein the curing step comprises exposing the molding material mixture to a temperature of at least 100° C. for a time not exceeding 5 min.

14. A method for aluminum casting, comprising
    preparing a molding material mixture according to claim 1,
    introducing the molding material mixture into a mold,
    curing the molding material mixture by removing water therefrom through applying heat to produce a casting mold or a core, and
    pouring aluminum or an aluminum alloy into the casting mold or bringing the liquid aluminum or a liquid aluminum alloy in contact with the core.

15. The method according to claim 14, wherein the curing step comprises exposing the molding material mixture to a temperature of at least 100° C. for a time not exceeding 5 min.

16. The molding material mixture according to claim 1, wherein the content of barium sulfate is between 0.05 to 3.0 wt % in the molding material mixture.

17. A method of producing a mold or core for casting pieces from aluminum or an aluminum alloy with an improved cast surface, comprising the step of:
    producing a molding material mixture containing barium sulfate, a waterglass-based binder and particulate synthetic amorphous $SiO_2$.

* * * * *